United States Patent [19]

Paisley

[11] 4,432,918
[45] Feb. 21, 1984

[54] METHODS FOR FABRICATING SELECTIVELY PLUGGED HONEYCOMB STRUCTURES

[75] Inventor: Robert J. Paisley, Corning, N.Y.
[73] Assignee: Corning Glass Works, Corning, N.Y.
[21] Appl. No.: 295,611
[22] Filed: Aug. 24, 1981
[51] Int. Cl.³ .................... C04B 37/00; C04B 41/24
[52] U.S. Cl. ........................ 264/43; 264/60; 264/251; 264/264; 264/267
[58] Field of Search ................ 264/43, 60, 264, 267, 264/251

[56] References Cited
U.S. PATENT DOCUMENTS

| | | | |
|---|---|---|---|
| 3,926,702 | 12/1975 | Oki et al. | 264/60 |
| 4,041,591 | 8/1977 | Noll et al. | 428/117 |
| 4,041,592 | 8/1977 | Kelm | 428/117 |
| 4,200,604 | 4/1980 | Dziedzic | 264/60 |
| 4,276,071 | 6/1981 | Outland | 428/116 |
| 4,283,210 | 8/1981 | Mochida | 264/60 |
| 4,293,357 | 10/1981 | Higuchi et al. | 264/63 |
| 4,304,585 | 12/1981 | Oda | 264/60 |

Primary Examiner—James H. Derrington
Attorney, Agent, or Firm—R. N. Wardell

[57] ABSTRACT

Methods for selectively plugging cells of a honeycomb structure for the fabrication of solid particulate filter bodies and other applications in which plugs are first formed at one end of all of the cells of the structure and then are removed from the ends of some of the cells by moving the plugs in those cells through the structure to their opposing ends or by removing those plugs entirely from the cells and the structure. The former method suitably positions plugs to form a filter body. The latter method must be repeated at both open end faces of the honeycomb structure in order to form a filter body. The latter method may be practiced by removing the plugs with a vacuum or by pushing the plugs out or through and out the structure. The invention also includes several apparatus embodiments for removing/moving a selected subset of the plugs formed in the same end portion of a multiplicity of cells of a honeycomb structure.

12 Claims, 13 Drawing Figures

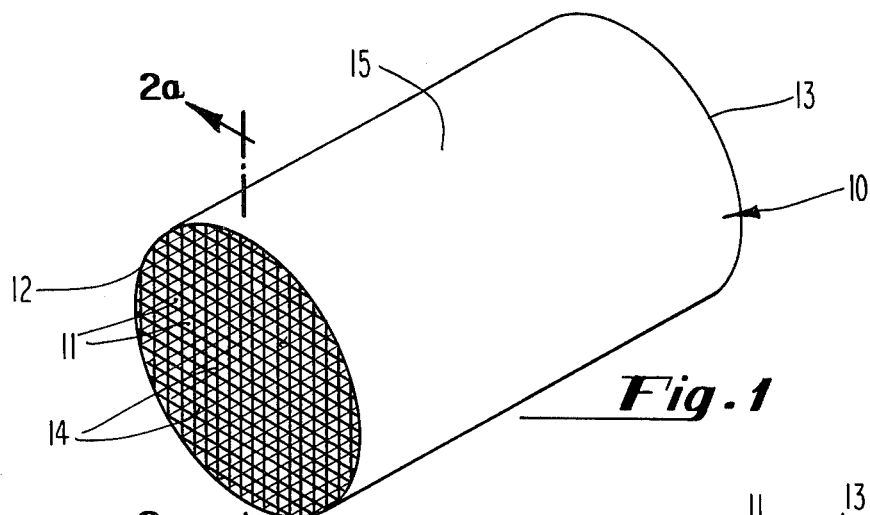
*Fig. 1*
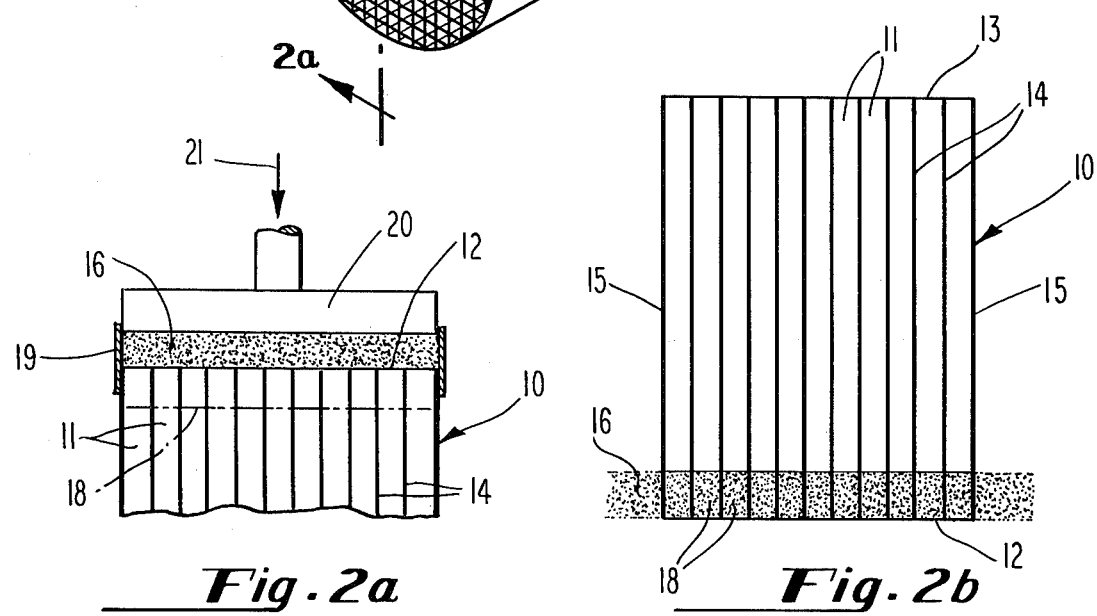
*Fig. 2a*  *Fig. 2b*
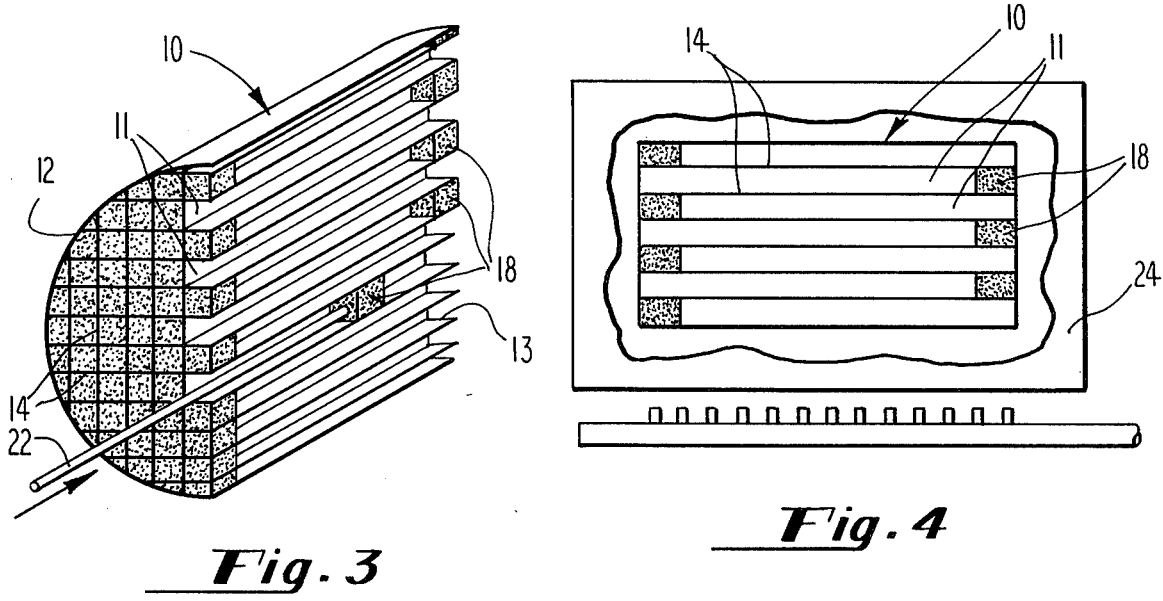
*Fig. 3*  *Fig. 4*

METHODS FOR FABRICATING SELECTIVELY PLUGGED HONEYCOMB STRUCTURES

BACKGROUND OF THE INVENTION

The invention relates to solid particulate filter bodies and other selectively plugged honeycomb structures and, in particular, to methods and related apparatus for fabricating such structures.

It is well known that a solid particulate filter body may be fabricated from a cellular or honeycomb structure which typically consists of a multiplicity of mutually adjoining and substantially parallel hollow passages or cells extending through the structure and through and between a pair of its opposing end faces where the open, transverse cross-sections of the cells are exposed. The cells themselves are formed by thin, porous walls which extend continuously between the end faces and intersect with one another so as to form a continuous matrix across the end faces. The cells are typically provided in densities ranging from one-tenth to more than one hundred cells per square centimeter. To fabricate such filter bodies, one end of all of the cells are typically blocked by manifolding (i.e. plugging), sealing or otherwise, a first subset of cells being blocked at one end face and the remaining cells being blocked at the remaining end face of a honeycomb structure. Either of the end faces may then be used as the inlet face of the resulting filter. The contaminated fluid is brought under pressure to the inlet face and enters the filter body via those cells which are open at that face (i.e. the "inlet" cells). Because these cells are blocked at the opposing "outlet" end face, the contaminated fluid is forced through the thin, porous walls into adjoining cells which are desirably sealed at the inlet face and open at the outlet face (i.e. "outlet" cells). The solid particulate contaminant in the fluid which is too large to pass through the porous openings in the thin walls is left behind and a cleansed fluid exits the filter through the outlet face for use.

For the mass production of such filters, it is highly desirable to be able to seal selected cell ends as rapidly and as inexpensively as possible. Thousands of cells may be provided in each honeycomb structure, all or substantially all of which must be sealed at one or the other end face. Rodney Frost and Irwin Lachman describe in a pending application Ser. No. 165,646, filed July 3, 1980, entitled FILTER AND RELATED APPARATUS, and assigned to the assignee of this application, a solid particulate filter body typically formed from an extruded ceramic-based substrate in which alternate cells at either end face are sealed in a checkered or checkerboard pattern such that each inlet cell shares thin, common walls with only outlet cells and each outlet cell shares thin, common walls with only inlet cells. These filter bodies are described as being fabricated by plugging the individual cell ends with a hand-held, single nozzle, air actuated sealant gun. Manifolding individual cells by this process is long and tedious and is not suited for the commercial production of such filters which may have thousands of cells to be plugged. Frost and Lachman also postulate the use of a sealant gun having an array of nozzles so that the plugging mixture may be simultaneously injected into a subset or all of the selected cells at each end face of the structure.

In a related area, U.S. Pat. No. 4,410,591 describes fabricating a multiple flow path filter body from a honeycomb structure having its cells arranged in adjoining columns. All of the cell ends at an end face of a honeycomb structure are filled with a temporary resist material such as a meltable plastic. The resist material is removed from selected columns of cells by cutting it away together with the intervening cell walls along the column at the end face. The cut at the end face is covered with a permanent sealant thereby creating a channel along each selected column which is transverse to the end face. The remaining temporary resist material is removed by suitable means. Alternatively, the selected columns are first cut away and then the resist material is applied and blown from the selected columns by compressed air directed down the cuts. Although these methods could be adapted to fabricate a type of filter body by applying sufficient sealant to plug the cells ends exposed by the cuts, it would be unsuited for plugging patterns other than columns and could not, for example, be used to produce the checked pattern of plugged cell ends described in the aforesaid application Ser. No. 165,646. Moreover, it would be desirable to eliminate the use of the temporary resist material as this adds an additional step and expense to the process.

SUMMARY OF THE INVENTION

It is a first object of the invention to provide a new method for selectively plugging cells of a honeycomb structure.

It is yet another object of the invention to provide a new method for selectively plugging honeycomb structures in the fabrication of solid particulate filter bodies.

It is yet another object of the invention to provide a method for more rapidly plugging cells of a honeycomb structure in the fabrication of solid particulate filter bodies than can be typically accomplished by the hand-filling methods previously employed.

It is yet another object of the invention to provide a method for fabricating solid particulate filter bodies by forming plugs of a final sealing material in all of the cells at the end face of a honeycomb structure.

It is yet another object of the invention to provide a method for fabricating solid particulate filter bodies which may be used with any desired plugging pattern.

According to the invention, these and other objects are accomplished by providing plugs at a given end portion of all of the cells of a honeycomb structure and then removing plugs from a selected subset of the cells. According to one aspect of the invention, plugs may be formed in a given end portion of all the cells of a honeycomb structure at one time by charging a flowable plugging material into all of the cells at an end face of the honeycomb structure. A viscous cement or other suitable plastically formable plugging material may be pressed into the end face and all of the cell ends or the end face may be dipped into a liquid cement or other plugging material which then dries or cures to form plugs. According to another aspect of the invention, plugs are removed from the given end portion in which they are formed either by moving the plugs in selected cells through the structure towards their other end portion or by removing the plugs entirely from the structure. In one preferred embodiment, a solid particulate filter body is formed by forming cement plugs in the cells of a honeycomb structure at one of its end faces and pushing the plugs in a selected subset of the cells from the one end portion in which they were formed to the remaining end portion so that all the cells of the structure are plugged at only one end portion. In a second embodiment, a solid particulate filter body is formed by providing cement plugs at a first end portion of all the cells of a honeycomb structure; removing the plugs in a selected subset of the cells from the structure; providing additional plugs at the remaining end portions of all the cells; and removing the plugs, preferably by vacuum, from those cells which remain plugged at their first end portion.

It is yet another object of the invention to provide an apparatus for removing plugs from given end portions of selected cells of a honeycomb structure.

According to the invention, a head having a plurality of openings extending through it is aligned with the end face of a honeycomb structure, the openings being located in the head so as to coincide with the open ends of the selected cells when the head is aligned with respect to the end face. Means are provided acting through the openings to remove plugs located in the opposing selected cells. In fabricating solid particulate filter bodies, the means are preferably thin, rigid members each passing through an opening to push the plugs provided in the end portion of the selected cells proximal to the head through the structure to their remaining end portion. According to another aspect of the invention, fluid means such as a vacuum or a compressed fluid may be created or passed, respectively, through the openings to move or remove the plugs.

BRIEF DESCRIPTION OF THE DRAWINGS

FIG. 1 depicts an exemplary honeycomb structure of the type used in the fabrication of solid particulate filter bodies with the inventive method;

FIG. 2a is a sectioned view of the honeycomb structure of FIG. 1 along the line 2a—2a showing cement plugs being formed in a given end portion of all the cells of the structure by pressing a cement mixture into an open end face of the structure;

FIG. 2b depicts in a sectioned view of the structure similar to that in FIG. 2a, the forming of cement plugs in a given end portion of all of the cells of the honeycomb structure of FIG. 1 by inserting an end face of the structure into a layer of cement;

FIG. 3 is a view of the sectioned honeycomb structure of FIGS. 2a and 2b showing a plug being moved through the structure to the opposing end face;

FIG. 4 is a view of the sectioned honeycomb structure of FIG. 3 having cement plugs at alternate cell ends being fired to sinter the plugs to the cell walls;

DETAILED DESCRIPTION OF THE INVENTION

Figure 5:
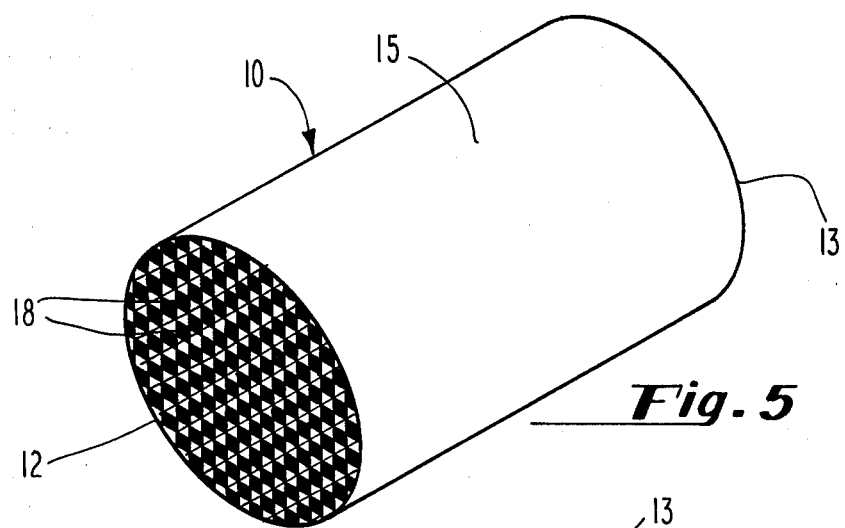
FIG. 5 is a perspective schematic view of a desired solid particulate filter body formed by the methods of FIGS. 1 through 4 depicting the checkered pattern of alternately plugged cell ends.

In one aspect, the invention is a method for selectively plugging cells of a honeycomb structure. Preferred and alternate embodiments of this aspect of the invention are hereinafter described in the context of fabricating a solid particulate filter body of the type described and claimed in the aforesaid application Ser. No. 165,646, incorporated by reference herein, having a first subset of alternate cells plugged at one end face thereof and the remaining alternate cells of the structure plugged at its remaining end face. It will be appreciated by one in the art that the described methods may be used to fabricate selectively plugged honeycomb structures for applications other than filtering.

All of the accompanying figures depict an exemplary honeycomb structure 10 used in the fabrication of the filter bodies. The structure 10 has been isolated in FIG. 1 and comprises a multiplicity of hollow passages or cells 11 which extend in a substantially mutually parallel fashion through the structure between opposing, circular end faces 12 and 13. The end faces 12 and 13 typically are substantially square to the central longitudinal axes of the cells 11 which are formed by walls 14 extending between the end faces 12 and 13. For solid particulate filter body fabrication, the walls 14 are porous and intersect with one another to form a continuous matrix across and between the end faces 12 and 13. The walls 14 are also preferably uniformly thin although walls of non-uniform thickness may also be used with less efficiency. A somewhat thicker outer covering or skin 15, typically formed from the same material used in the thin walls, may be provided around the cells 11 between the end faces 12 and 13. Although the depicted cells 11 have been provided with substantially square transverse cross-sectional geometries, other shapes such as circles, elipses and triangles, other quadrilaterals and polygons may be substituted. Also, the cells need not be limited to row and column arrangements and the honeycomb structure need not be limited to a cylindrical shape, as depicted.

Honeycomb structures for solid particulate filter bodies may be formed from a variety of porous materials including ceramics, glass-ceramics, glasses, sinterable metals, cermets, resins or organic polymers, papers or textile fabrics (with or without fillers), etc. and various combinations thereof. Honeycomb structures having the necessary thin, porous, interconnected walls desired for solid particulate filtering applications are preferably fabricated from plastically formable and sinterable finely divided particles and/or short length fibers of substances that yield a porous, sintered material after being fired to affect their sintering, especially powdered metals, ceramics, glass-ceramics, cermets, and other ceramic based mixtures. As desired, any suitable or conventional fugitive or combustible (burn-out) additive can be dispersed within the formable and sinterable mixture so as to provide appropriate and adequate open porosity in the thin walls 14. Requisite open porosity can be designed into the walls 14 by raw material selection as is described in U.S. Pat. No. 3,950,175. The formation of a porous walled ceramic honeycomb monolith having cordierite as its primary crystal phase, which is preferred for moderately high temperature solid particulate filtering applications (less than approximately 1,500° C.) and with which the present invention has been practiced, is described in the aforesaid Frost and Lachman application Ser. No. 165,646, which is incorporated by reference herein in its entirety. Several ceramic raw material compositions resulting in varying thin wall porosities are described.

A filter body is formed from the honeycomb structure 10 by closing in some fashion (i.e. covering, sealing or plugging) the open ends of a first subset of alternate cells at one end face and the open ends of the remaining alternate cells at the remaining end face. According to the invention, plugs are first provided in one end portion of all the cells 11 of the structure 10. Various foam-type cordierite cement compositions, which foam into a cordierite primary crystal phase when sintered and which are suitable for use with the aforementioned cordierite honeycomb structures, are described and claimed in a pending application Ser. No. 165,647 by Robert Paisley, filed July 3, 1980, which is now Pat. No. 4,297,140 and incorporated by reference herein. A particular composition of that cement preferred for use in high sodium ion filtering applications such as diesel exhaust particulate filtering is described in the aforesaid application Ser. No. 165,646. Typically these compositions are formed having a relatively high viscosity and are charged into the cells under pressure in the manner depicted in FIG. 2a. There, a layer 16 of the preferred plastically formable, foam-type ceramic cement has been applied to one end face 12 of the honeycomb structure 10 and is held in position on the end face by suitable means such as a collar 19 affixed around the circumference of the end face 12. A piston 20 advanced in the direction of the arrow 21 or other suitable means is used to press the cement 16 into the ends of the cells 11 at the end face 12. Plugs 18 formed by this step are depicted in phantom. FIG. 2b depicts an alternative method of forming plugs at the end face 12 of the structure 10 of FIG. 1 by inserting the end face 12 into a layer 16 of ceramic cement. The structure 10 has been sectioned in a manner similar to that in FIG. 2a to reveal cement plugs 18 of the layer 16 material formed in the end portion of each of the cells 11 at the end face 12. The layer 16 may range from a low viscosity, liquid-like slurry to a relatively high viscosity, plastically formable, semi-solid layer. In the latter case, it is envisioned that the structure 10 would be pressed into the layer 16 somewhat like a cookie cutter to cut plugs 18. As lower viscosity cements are used, it may be necessary to insert the end face 12 into the layer 16 more than once, drying the material deposited in the cells between each dip to build up a solid plug 18 in each cell end. It will be appreciated by those skilled in the art that other methods are available for charging materials into the cell ends of honeycomb structures and that non-foaming ceramic cements and other plugging materials may be employed in the practice of the invention.

Next, according to the invention, only selected cells of the structure are kept plugged at the one given end portion by moving or removing the plugs from that end portion of the remaining cells. In the preferred embodiment, foam-type ceramic cement plugs 18 are formed as has been described and allowed to dry to the green state (i.e. not sintered). In drying, the plugs 18 will solidify and contract slightly from the thin walls 14. The solid plugs 18 in selected alternate cells are broken free and pushed by suitable means through the structure 10 to the opposing end face 13. In the preferred embodiment, a solid rod-like member 22 is used to break the plugs 18 free and move them through the structure as is depicted in FIG. 3. It is envisioned, however, that other means such as a fluid directed against the plug at the end face 12 may also be used. When the plugs 18 in all of the alternate cells at the end face 12 have been moved to opposing end face 13, the structure 10 and plugs 18 are fired in an appropriate oven 24 as is depicted in FIG. 4 causing the plugs 18 to foam and fill the cell ends and to sinter to the thin walls 14. The structure 10 in FIG. 4 has again been sectioned revealing the plugs 18 formed in alternate ends of a column (or rows) of cells through the structure 10.

The solid particulate filter body fabricated by the steps of FIGS. 1 through 4 is depicted in a perspective view in FIG. 5 revealing the desired checkered pattern of alternately plugged cells at the end face 12, the plugging pattern being reversed at the opposing end face 13. The solid particulate filter body depicted in FIG. 5 is described and claimed in the aforementioned Frost and Lachman application Ser. No. 165,646. Further information regarding the operation of the filter body is also provided therein. The described method may, of course, be used to fabricate filter bodies with any other desired plugging patterns.

Figure 6:
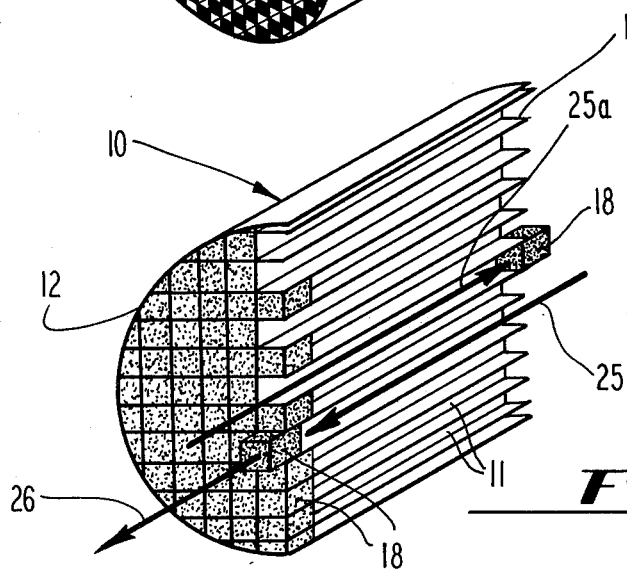
FIG. 6 is a view of the sectioned honeycomb structure of FIGS. 2a and 2b showing plugs being removed from the structure through either of its end faces.

FIG. 6 depicts an alternate method embodiment for selectively plugging cells of honeycomb structures as in the fabrication of solid particulate filter bodies in which plugs 18 are again provided in one end portion 12 of all of the cells 11 of a honeycomb structure 10 and a subset are removed entirely from the structure 10 by suitable means. These means may include a solid member or fluid passed down the length of the selected cells 11 from the opposing end face 13 in the manner depicted by the arrow 25 to push plugs 18 out of the selected cells. Alternatively, plugs may be pushed by such means from the end face 12 to the end face 13 and out of the structure as indicated by the arrow 25a. Lastly, plugs may be drawn from the end face 12 in the direction indicated by the arrow 26 by a suitable vacuum source placed opposite the plug.

Figures 7A, 7B:
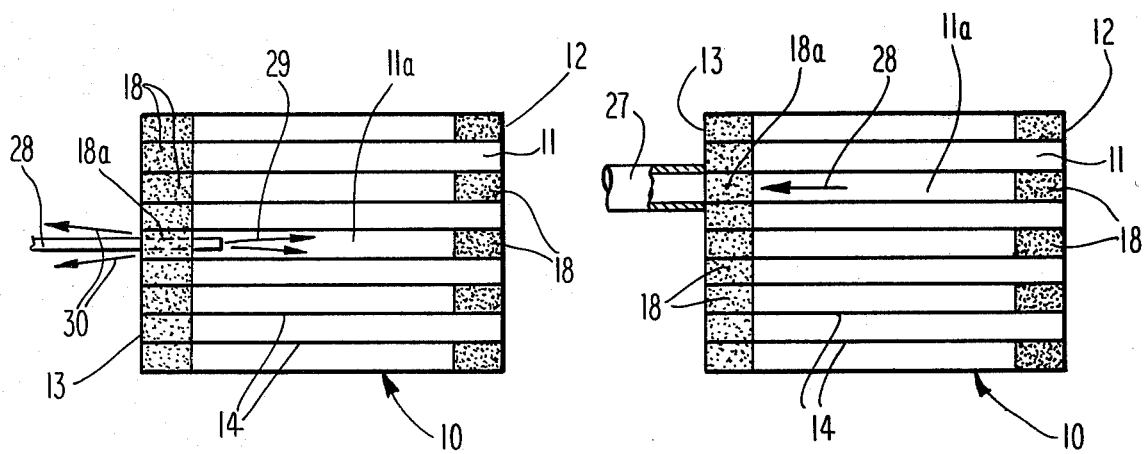
FIG. 7a is a schematic sectioned view depicting the removal of a plug from a given end portion of a cell plugged at both its ends by applying a vacuum to a plug at one end face.
FIG. 7b depicts the removal of a formable plug from a given cell end portion by injecting a compressed fluid into the cell through a tube passed through the plug.

To fabricate a filter body as shown in FIGS. 7a and 7b, the cells 11 are all plugged at the opposing end face 13, typically in the manner depicted in FIGS. 2a or 2b, and plugs 18a are removed from those cells 11 which remain plugged at the end face 12. One method of removing plugs from those cells plugged at the end face 12 is depicted in FIG. 7a. A vacuum is applied by means of a hollow tube 27 to the end face 13 opposite a cell 11a and the plug 18a in that cell end is vacuumed from the structure 10 in the direction indicated by the arrow 28. Such vacuuming is accomodated by porous walls 14 and open ends of selected cells 11 at end face 12. This method is preferably practiced before the cement plug 18a has had a chance to dry and solidify to the thin walls 14, although it is envisioned that this method also may be practiced using dried cement plugs. An alternative method of removing plugs which is more suited for use in honeycomb structures having non-porous or essentially non-porous thin walls 14 is depicted in FIG. 7b. According to this alternative method, a small hollow tube 28 is passed through the plug 18a while still in a semi-solid state and a suitable fluid passed through the tube in the direction indicated by the arrows 29 into the cell 11a forcing the material forming the plugs 18a out of the cell in the direction indicated by the arrows 30. The opposing end of the cell must be blocked to allow a sufficient build up of fluid pressure to cause the ejection of the plug 18a material. A previously formed plug 18 is depicted being used for this purpose but other means such as a layer 32 of a suitable, non-porous or substantially non-porous material may be used (See FIG. 8b). Again, although it is preferred that a foam-type cement be used to practice the embodiments depicted in FIGS. 7a and 7b, it will be appreciated that these methods do not result in a reduction of the transverse diameter of the retained plugs 18 as often occurs with the embodiment depicted in FIG. 3 and thus, may more readily be used with a non-foaming type cement or other sealant. The plugs 18 formed at the end face 13 by the methods of FIGS. 7a and 7b may be allowed or caused to sinter, cure, harden or otherwise rigidify in adherence to the walls 14 by any means suitable for the cement selected. Again, if the preferred foam-type cordierite cement or another sinterable or thermally curable cement, either foaming or non-foaming type is used, the structure 10 and plugs 18 are heated in the manner depicted in FIG. 5.

Figure 8:
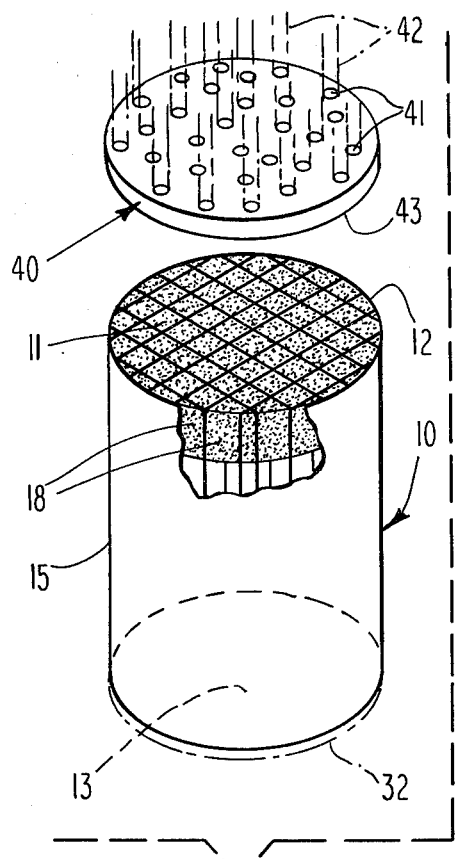
FIG. 8 depicts schematically an envisioned apparatus for removing a subset of the plugs formed at a given end portion of the cells of a honeycomb structure in fabricating a solid particulate filter body.
Figure 8A:
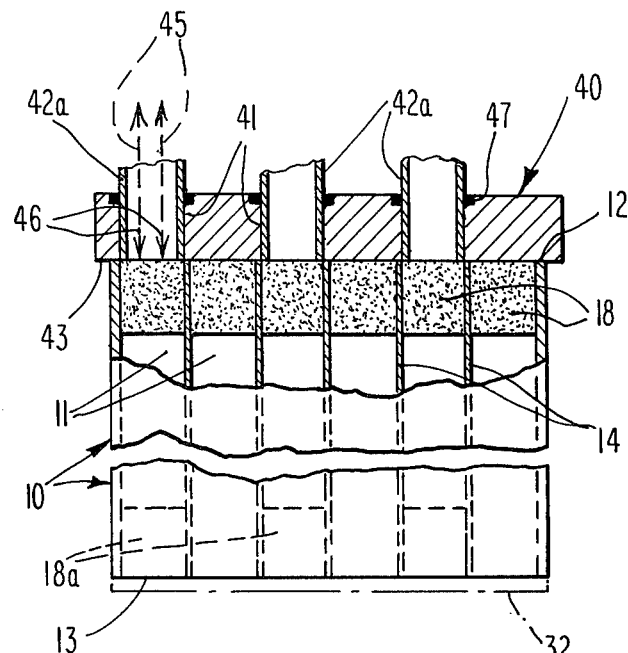
FIGS. 8a, 8b, and 8c depict in expanded, sectioned views, three particular embodiments of the apparatus of FIG. 8 with honeycomb structures.
Figure 8C:
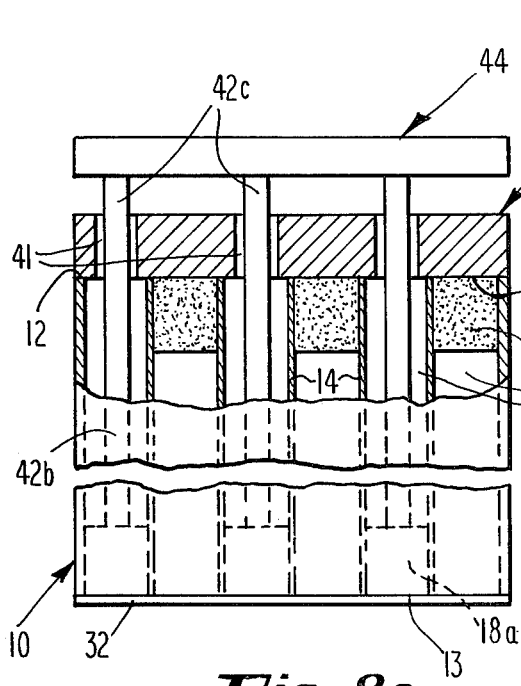
Figure 8B:
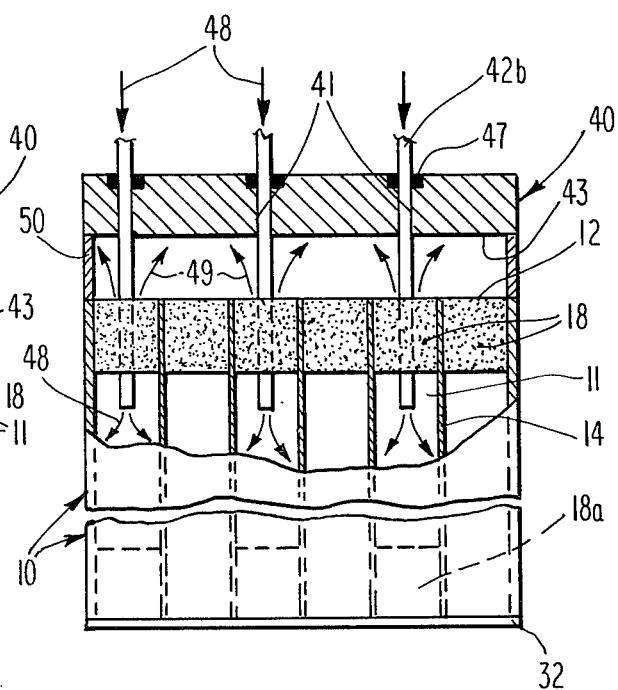

Another aspect of the invention is apparatus for moving or removing plugs from a given end portion of a plurality of cells in a single operation. Several possible embodiments of this aspect of the invention may be used to fabricate the previously described ceramic-based solid particulate filter bodies and may also be suitable for forming selectively plugged honeycomb structures from other materials and for other uses. A general apparatus 40 is depicted schematically in FIG. 8 while three particular embodiments are depicted in FIGS. 8a, 8b, and 8c, respectively. In each embodiment, a substantially rigid head 40 is provided having a plurality of openings or bores 41 extending in a substantially axial direction therethrough which are spaced from one another so as to coincide with the ends of a selected plurality of cells 11 of a honeycomb structure 10 from which plugs 18 are to be removed. A downstream face 43 of the head 40 is positioned opposite an end face 12 (or 13) of the structure 10 with the bores 41 opposite selected cells 11. Means 42, 42a, 42b, and 42c, (FIGS. 8, 8a, 8b, and 8c, respectively) are further provided acting through the bores 41 for moving or removing the plugs 18.

In a first particular embodiment depicted in FIG. 8a, the head 40 has been sectioned to reveal hollow tubes 42a affixed in the bores 41 by suitable means 47 such as soldering, cementing, welding, press-fit gasket, O-ring, etc. The tubes 42a may be used to apply a vacuum to (as indicated by arrows 45) or to charge a fluid such as air under pressure against (as indicated in phantom by arrows 46) plugs 18 in the cells 11 opposite each tube 42a. Where plugs 18 have been formed at only one end portion of the cells, either a vacuum or pressurized fluid may be used as depicted in FIG. 6 to draw or push, respectively, plugs 18 from selected cell ends 11. Alternatively, the embodiment of FIG. 8a may be used with a compressed fluid to drive the plugs 18 to the opposing end portions of selected cells. A porous covering 32, preferably with a pressure sensitive adhesive backing, can be provided to catch and hold the moved plugs within cells 11. The head 40 is applied to the end face 12 where the plugs are formed to prevent dispersal of the fluid or loss of the vacuum through the porous thin walls 14 of the structure 10. The head 40 might be positioned at either end face of a nonporous structure. Where plugs are to be removed from cells having plugs in both their end portions, as is depicted in FIG. 8a, it is preferred that the head 40 be used with a vacuum being supplied through the tubes 42a. However, pressurized fluid passed through the tubes 42a could conceivably be used to drive these plugs to the opposing end face forming a double plug at that end portion of the selected cells, if acceptable for the end use of the structure 10.

Alternatively, thin hollow tubes 42b having outer diameters less than the maximum inner diameter or width of the cell ends may be fixed by suitable means 47 to a substantially rigid head 40 with the tubes 42b protruding a sufficient length from the downstream face 43 for penetration of and insertion through the green or uncured plugs 18 as indicated in FIG. 8b. The cells 11 receiving the tubes 42b must be closed at their other end portions by suitable means such as previously formed plugs 18a (in phantom) or a solid, non-porous covering 32. A compressed fluid, preferably air, is passed through the tubes 42b in the manner depicted by the arrows 48 forcing the plug material out of the cell ends as indicated by the arrows 49. This embodiment is more suited for use with non-porous honeycomb structures as the fluid will tend to disperse into adjoining cells through cell walls 14 which are porous. Rigid members 50 or other suitable means are provided to space the head 40 sufficiently away from the opposite end face to provide an area into which the plug material may be expelled from the ends of the cells 11.

A preferred embodiment for fabricating the previously described ceramic solid particulate filter bodies is depicted in FIG. 8c. Solid members 42c such as rods or heavy wire are provided and are used to push the plugs 18a in cells 11 opposite the bores 41 through the structure 10 to the opposing end face 13. Plugs 18 formed by depositing a wet plastically formable or liquid ceramic cement in the cell ends are preferably allowed to dry and shrink making their dislodgement from the thin walls 14 easier. The members 42c may be fixed in another rigid member such as a solid head 44 for simultaneous advancement and retraction of all the members 42c to and from the structure 10. The solid head 44 may be moved by hand or other suitable means such as a linearly operating mechanical arm (neither depicted). It is suggested that a covering 32 be applied to the end face 13 to catch and hold the detached plugs 18a within cells 11. A masking tape or a pressure sensitive adhesive backed plastic tape is useful for this purpose and it can be removed before firing the plugs or left in place to be burned away when the structure is subsequently sintered. The various apparatus depicted in FIGS. 8, 8a, 8b, and 8c may be used by being placed upon the end face 12 of a structure 10, as depicted, or by mounting in a suitable frame (not depicted) which will hold the end face 12 in alignment against or adjacent the downstream face 43 of the head 40 during the plug moving/removing process.

It is envisioned that plugs broken loose and moved through selected cells of a honeycomb structure to their opposing end portions may be affixed at that end face by means other than foaming such plugs. For example, non-foaming plugs may be provided and means such as a liquid cement or adhesive which would bind the close fitting plugs to the cells walls, but not have sufficient surface tension to form a covering over unplugged cells, could be applied to the end face. A covering 32 used in such a case would be sufficiently porous to allow the liquid to penetrate into the cell ends. Also, an appropriate ceramic cement can be selected for use with a green (i.e. unfired), porous, ceramic honeycomb structure such that the structure will experience a greater net shrinkage during sintering than any total net shrinkage experienced by the formed plugs. In other words, during firing of such plugged structure, the plugs undergo relative expansion in relation to the structure such that the structure compresses onto the plugs. Exemplary ceramic substrate and cement composition combinations are identified in copending application Ser. No. 295,612 by Arthur Hillman and Robert Paisley filed Aug. 24, 1981, which is assigned to the assignee of this application and incorporated by reference herein. It will further be appreciated that the subject method and apparatus may be used in conjunction with solid, rigid plugs inserted into cell ends of a honeycomb structure. In such a case, it is envisioned that a shrinkable structure, such as an unfired sinterable ceramic substrate, be used with the plugs and subsequently shrunk (i.e. by sintering the substrate) causing the plugs to be frictionally gripped by the shrunken thin walls forming the cells (i.e. the structure become shrink-fitted onto the plugs) or that the plugs be bonded in a final location by some suitable means such as by the previously referred to application of a liquid cement or adhesive.

Although the invention has been described in terms of preferred and other embodiments with suggested modifications, it will be appreciated by one in the art that the aforesaid embodiments were merely illustrative and are not intended to encompass all possible variations of the invention, the scope of which is defined in the appended claims.

What is claimed is:

1. A method for selectively plugging with a final sealing material a subset of a multiplicity of cells through a honeycomb structure comprising the steps of:
   providing plugs of a sinterable material in one end portion of each of said multiplicity of cells;
   removing the plugs of sinterable material from the one end portion of all but said subset of said multiplicity of cells; and
   firing the honeycomb structure to sinter the plugs.

2. The method of claim 1 wherein said step of providing plugs further comprises simultaneously forming the plugs in the one end portion of said multiplicity of cells.

3. The method of claim 2 wherein said step of forming plugs further comprises charging a plastically formable sinterable material under pressure against an end face of the structure.

4. The method of claim 2 wherein said step of forming plugs further comprises dipping an end face of said honeycomb structure into a layer of sinterable material.

5. The method of claim 1 used in the fabrication of solid particulate filter bodies wherein said step of removing comprises moving the plugs from one end portion to the remaining end portion of all but said subset of said multiplicity of cells.

6. The method of claim 5 wherein said plugs are formed from a wet sinterable cement mixture and said method further comprises, before said step of removing, the step of drying said cement plugs.

7. The method of claim 6 wherein plugs are moved by means of a solid member passed substantially through the cells in which said plugs are provided.

8. The method of claim 6 wherein said wet cement mixture foams when heated and said method further comprises, after said moving step, the step of heating said structure to foam said plugs.

9. The method of claim 1 wherein said step of removing the plugs from the one end portion of all but said subset further comprises removing said plugs in all but said subset of cells from said honeycomb structure.

10. The method of claim 9 further comprising the steps of:
    providing plugs in the remaining end portions of said multiplicity of cells; and
    removing the plugs from said remaining end portion of a second selected subset of cells.

11. The method of claim 10 wherein the plugs in said second selected subset of cells are removed from the honeycomb structure by means of a vacuum.

12. The method of claim 9 wherein the plugs are formed of a wet sinterable cement and the removing of the plugs comprises vacuuming the wet cement plugs from said honeycomb structure.

* * * * *